Nov. 19, 1957  F. G. PEARCE  2,813,919
PROCESS FOR MANUFACTURE OF ACETYLENE
Filed June 1, 1954
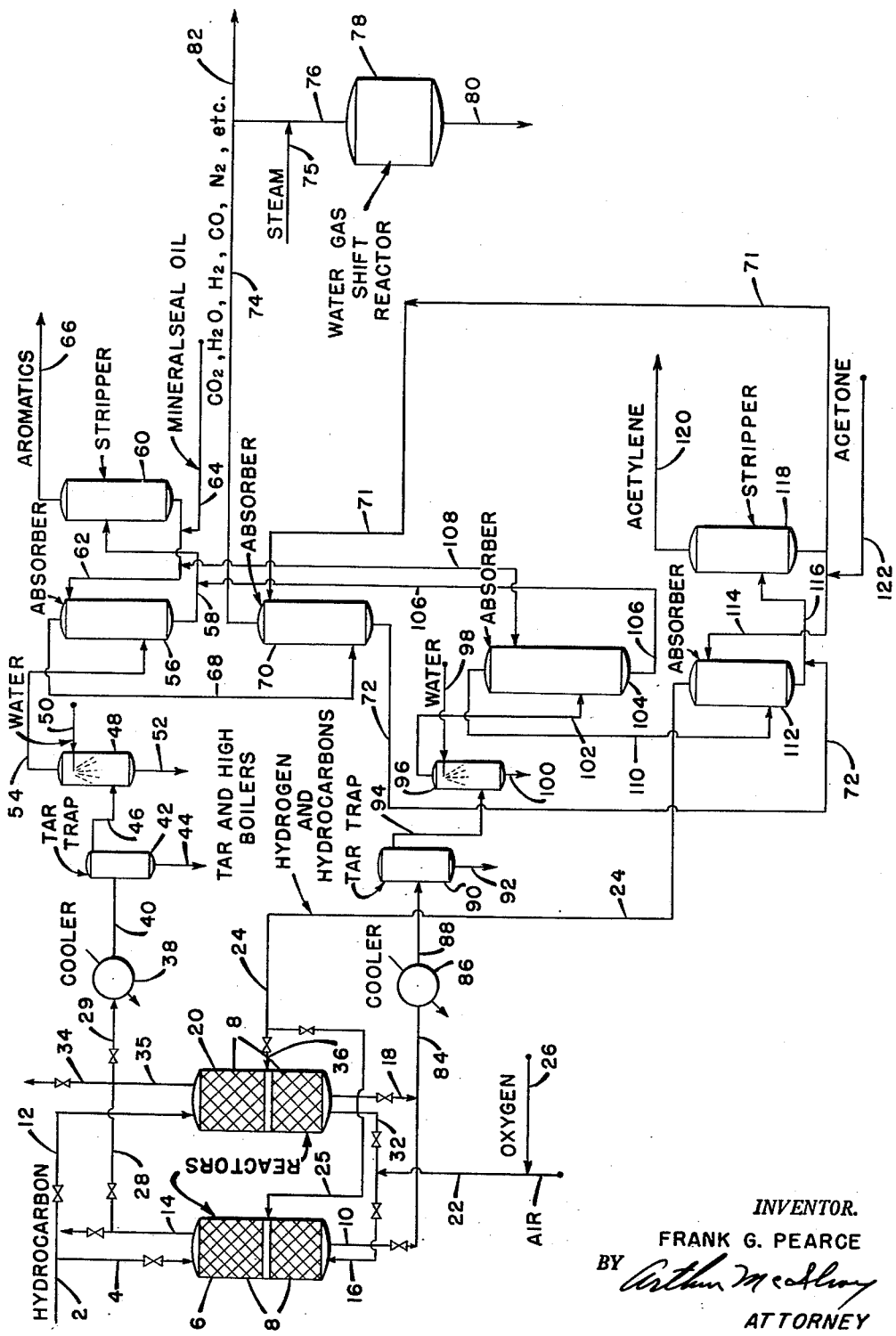
INVENTOR.
FRANK G. PEARCE
BY
ATTORNEY

United States Patent Office 2,813,919
Patented Nov. 19, 1957

2,813,919

PROCESS FOR MANUFACTURE OF ACETYLENE

Frank G. Pearce, Tulsa, Okla., assignor to Pan American Petroleum Corporation

Application June 1, 1954, Serial No. 433,598

11 Claims. (Cl. 260—679)

The present invention relates to an improved method for effecting synthesis of acetylene from normally gaseous hydrocarbons. More particularly, it pertains to an integrated procedure for preparing actylene and synthesis gas of the types employed in hydrocarbon, methanol or ammonia synthesis.

One of the principal problems involved in the production of acetylene from normally gaseous hydrocarbons is the transfer of heat to the reactants in order to increase their temperature to a level at which the desired reaction will occur; namely, from about 2,000° F. to about 3000° F. At this temperature heat must also be supplied continuously for the endothermic heat of reaction. Means for effecting a rapid quench of the hot product gases to prevent decomposition of the acetylene produced constitutes another major problem. In an effort to solve such problems, two methods of producing acetylene from light hydrocarbons have been developed, viz., the partial oxidation and the hydrocarbon cracking processes. They have succeeded to such an extent that the manufacture of acetylene from hydrocarbons is now considered to be a more economical method than the old and well-known procedure for the production of acetylene from coke and lime via calcium carbide.

In the partial oxidation process referred to above, the feed hydrocarbon is mixed with relatively pure oxygen, preheated and passed into a combustion chamber. The heat of partial oxidation of a portion of the feed supplies the heat required to raise the mixture to reaction temperature and for the endothermic heat of reaction for the production of acetylene. Thereafter, the products are rapidly quenched by means of a water spray. The disadvantages of such a process are: (1) poor heat economy because of the necessity for a water spray and (2) high investment and operating costs associated with the use of comparatively large quantities of relatively pure oxygen. In one embodiment of the cracking process, a regenerative furnace is used in a two-cycle operation. During the acetylene production cycle, the hydrocarbon feed material is introduced into one end of a refractory-packed chamber which is progressively hotter from the entrance end to the center thereof and progressively cooler from the center to the discharge end of said chamber. The feed is heated to reaction temperature as it approaches the center, reacts to form acetylene and is then rapidly quenched by the cold refractory in the second half or discharge end of the chamber. In this step, the inlet end is cooled and the effluent end is heated. During the heating cycle, air is introduced into the unit through the discharge end. The cold air extracts heat from the hot refractory as it approaches the center of the chamber or furnace. Fuel is injected into the center of the furnace and is burned in the presence of an excess of preheated air, previously injected, at a very high temperature. The products of complete combustion discharge through the entrance end of the furnace and heat the refractory from the center to the entrance end thereof for the next production cycle. During the reheat or regenerative cycle, any carbon deposited in the production stage is burned to carbon oxides. At the end of the reheat cycle, the furnace is restored to the conditions required for the production cycle. The disadvantages of the cracking process are: (1) an overall higher cost of acetylene than is realized in the partial oxidation process and (2) lack of the by-product credit which is available in the partial oxidation process in the form of carbon monoxide and hydrogen.

Accordingly, it is an object of my invention to provide a procedure for the preparation of acetylene incorporating the advantages of both the aforesaid processes and avoiding disadvantages thereof. More specifically, it is an object of my invention to provide a method for the manufacture of acetylene from light hydrocarbons which, at the same time, is capable of furnishing carbon monoxide and hydrogen in sufficient quantities and in suitable ratios for use in hydrocarbon, methanol and similar syntheses without the aforementioned disadvantages of the partial oxidation process. Also, in this regard, it is a further object of my invention to prepare simultaneously with acetylene, if desired, gaseous mixtures of nitrogen and hydrogen in quantity, purity and proportions suitable for ammonia synthesis. It is another object of my invention to provide a method for heating the refractory in the reaction chamber, used to convert said hydrocarbons to acetylene, involving mixing a stream of air or oxygen-enriched air, entering through the discharge end of said chamber, with the gaseous product stream from which acetylene has been removed and partially oxidizing the resulting mixture to supply heat for the aforesaid regeneration step.

Briefly stated, the process of my invention renders possible effecting the regeneration step under conditions which result in only partial combustion of the hydrocarbon component in the aforesaid gaseous stream to yield hydrogen, carbon monoxide and nitrogen in varying proportions. As will be pointed out in greater detail below, my invention possesses a material advantage over the conventional partial oxidation process for producing acetylene in that the heat economy afforded by the former is much greater, while its principal advantage over prior cracking processes for producing acetylene is that the fuel employed in the regeneration step is only partially oxidized to produce valuable by-product synthesis gas; whereas, in said prior art processes, said fuel is completely oxidized to carbon dioxide and water.

In carrying out the process of my invention, a suitable hydrocarbon is fed into the front end of a refractory-packed chamber wherein the temperature prevailing in about the first half of the chamber gradually increases toward the center of the chamber to a value in the neighborhood of 2500° F. Under these conditions, cracking of the hydrocarbon occurs to produce acetylene in substantial quantities together with other unsaturated hydrocarbons and hydrogen. The products which form near the center of the chamber then pass to the outlet end thereof and, in doing so, give up a major portion of their heat to relatively cold refractory material which serves as a quenching medium. The resulting cooled product gas, after being still further cooled, is treated, if necessary, to remove high boiling constitutents, aromatics, etc., and then sent to a conventional absorbing tower where it is countercurrently scrubbed under pressures of from about 200 to 400 pounds p. s. i. at, for example, 60° to 100° F., with a suitable selective solvent for acetylene such as acetone, acetonyl acetate, dimethylformamide, etc. The rich absorbent solution is next taken to a suitable extractant and regenerator or stripping tower where product acetylene is recovered overhead and lean absorbent is returned to the absorption column for a succeeding cycle. The gas passing overhead in the absorption step consists chiefly of hydrogen and hydrocarbons. In accordance with my invention, this gas is employed, together with controlled amounts of oxygen or oxygen-containing gases, in a novel manner for the purpose of effecting regeneration of the aforesaid chamber for the next production cycle, as is described in further detail hereinafter.

In the process contemplated by my invention, two refractory-packed conversion units in which acetylene is formed are employed. In continuous operation, these units are utilized alternately in the production cycle, i. e., while one of the units is in the production cycle, the other is being regenerated. The regeneration step is carried out immediately after the production cycle which usually is from about 1 to about 3 minutes in duration. In effecting the regeneration step, air is introduced into the quenching end of the chamber that has just completed the production cycle. In this operation, the cool air removes heat from the relatively hot refractory in the second half of the reaction chamber and, as the resulting hot air contacts carbon deposited during the production cycle, said carbon is removed from the chamber as carbon oxides. During this step, which I refer to as the "reverse air blow," heat is transferred from the quenching section of the chamber to the portion thereof in which acetylene is primarily formed. In the regenerative cycle air or oxygen-enriched air is fed through the discharge end of the chamber and, as it approaches the center thereof, it is mixed with a controlled quantity of the stripped gaseous stream coming off the top of the absorption tower previously referred to and which is employed to extract acetylene from the product gas. The aforesaid gaseous stream contains principally hydrogen and hydrocarbons, both saturated and unsaturated, and in controlled combustion with ordinary air, it is the source of very substantial quantities of hydrogen, carbon monoxide and nitrogen. The use of the stripped gaseous stream for fuel in the regeneration of the acetylene unit for a subsequent product cycle and the control of the combustion of said stream in a manner such as to result in products of partial combustion rich in hydrogen, carbon monoxide and nitrogen constitute principal features of my invention. The relatively high hydrogen to carbon ratio of the stripped gas is very advantageous in that it reduces the oxygen requirements per unit of hydrogen and carbon monoxide produced. Such ratio is, of course, dependent upon the conversion achieved during the production cycle and the type of feed hydrocarbon used. In this regard, while I have indicated that any normally gaseous hydrocarbon is suitable for use in my invention, I generally prefer hydrocarbons having a relatively high hydrogen-carbon ratio such as, methane, ethane, etc. This is for the reason that less oxygen is required for such lower molecular weight hydrocarbons to produce the desired products, i. e., hydrogen and carbon monoxide. Where it is desired to prepare ammonia synthesis gas during the aforesaid regeneration cycle, it may be desirable to employ oxygen-enriched air to control the nitrogen content of the product gas at a level to render the resulting hydrogen-nitrogen mixture suitable therefor.

Alternatively, in place of the combination of the production step and the reverse air blow, I may operate the conversion unit in a complete cycle as follows. Hydrocarbon is introduced at the front end of the heated unit or furnace where cracking of the hydrocarbon in a zone near the center of said furnace occurs to produce acetylene. The resulting product gas is withdrawn from the back or discharge end of the furnace. Air, oxygen-enriched air, or oxygen, depending upon the type of synthesis gas it is desired to produce as a by-product of my process, is next introduced in a predetermined amount, i. e., an amount sufficient only for partial combustion of the hydrocarbon component in said gaseous stream, at the discharge end of the furnace and preheated by the hot refractory before the air reaches the combustion zone located in the center of the unit. At this point, the aforesaid stripped gaseous stream is introduced into the combustion zone and hot combustion products resulting from this partial oxidation step pass through the refractory material, out the front end of the furnace and are recovered in the manner hereinafter described. Thereafter, the production step is repeated with the hydrocarbon being admitted to the furnace at the back side thereof and product gases containing acetylene withdrawn from the front. The regenerative step of the process is repeated with the air or oxygen being introduced at the front end of the furnace and resulting products of partial combustion removed from the back end of the furnace. This completes the overall cycle and the above-mentioned sequence of steps is thereafter repeated.

If desired, the procedure which is mentioned in connection with the injection of said stripped gaseous stream to the combustion zone may be varied to the extent that the discharge or outlet end of the furnace may be divided into two sections and air or oxygen admitted to one of said sections, while the aforesaid stripped gaseous stream is added to the other. In this manner, the two streams are separately preheated as they travel toward the combustion zone near the center of the furnace where they subsequently undergo partial oxidation to produce valuable by-product gases suitable for use in various synthesis, as described herein.

In operating the regeneration step mentioned above to produce ammonia synthesis gas, the quantity of air or oxygen-enriched air used varies with the molecular weight of the hydrocarbon in the aforesaid stripped gaseous stream. Thus, in the case of a gas consisting predominately of methane, the oxygen content of the oxygen-nitrogen mixture introduced may vary from about 30 to about 55 percent. With ethane, on the other hand, the oxygen content of the oxygen-nitrogen mixture should amount to from about 40 to about 65 percent. The actual quantity of oxygen added to the system for the aforesaid regeneration cycle is generally expressed in terms of volume percent of the hydrocarbon subjected to the cracking step. On this basis, I ordinarily may employ from about 35 to about 80 volume percent free oxygen. With methane employed as the feed to the cracking step, I generally prefer to use from about 35 to about 45 volume percent oxygen while, in the case of ethane, oxygen in amounts ranging from about 70 to about 80 volume percent is employed.

When using mixtures of the various hydrocarbons contemplated by my invention in the aforesaid cracking step, the quantity of free oxygen most advantageously employed in said regeneration step may range from about 45 to about 70 volume percent of the hydrocarbon mixture subjected to the cracking step, the optimum amount of oxygen used depending, of course, on the proportion of higher molecular weight of hydrocarbons present in said mixture.

Where it is desired to produce substantially pure carbon monoxide and hydrogen, such as is required in the methanol, oxo, or hydrocarbon syntheses, relatively pure oxygen should be employed in the regeneration step.

The process of my invention may be further illustrated by reference to the following flow diagram wherein a suitable hydrocarbon such as, for example methane, is introduced through lines 2 and 4 into a first reactor 6 packed with a refractory or regenerative material 8, such as, for example Carborundum. The latter is not packed closely, but is so arranged to permit relatively unobstructed passage of the reactant gas through the upper half of said reactor, the center of which is maintained at a temperature of, for example, about 2500° F. In this particular stage of my process, which I refer to as the "production step," and which requires a period of generally from about 1 to about 3 minutes, acetylene and hydrogen are formed and are forced downwardly contacting the lower half of reactor 6 in which said material 8 ranges in temperature from about 2500° F. near the center of the unit to about 300° F. at the discharge end thereof. Under these conditions, the hot product gas is suitably quenched to a temperature of about 300° F. and thereafter is withdrawn from the reactor through line 10. At this point in my process, valved lines 4 and 10 are closed and valved lines 12, 14, 16 and 18 are opened. These conditions now render possible continuation of the production cycle in reactor 20 and the reverse air blow and regeneration steps in reactor 6. In the reverse air blow cycle, cool air is added through lines 22 and 16 which serves to reduce the temperature of regenerative mass 8 in the lower half of reactor 6. Passage of air through the reactor results in the burning off of carbon deposited on the refractory during the production step. Hot products of combustion pass out of the reactor through line 14 and are vented to the atmosphere. The reheat or regeneration step may be accomplished by passing the residue or stripped gas from a subsequent part of the process, which will be described hereinafter in greater detail, into reactor 6 at a point near the center thereof through lines 24 and 25 where such gas is combined with the hot air, oxygen-enriched air or substantially pure oxygen introduced in predetermined amounts into the system via lines 16, 22 and 26. Under the conditions provided, partial combustion of the hydrocarbons introduced through line 25 occurs producing carbon monoxide, hydrogen, some additional quantities of acetylene and nitrogen, if air is employed to any degree in the reheat cycle.

Alternatively, this reheat or regenerative step may be effected at elevated pressures of, for example, from about 200 to about 400 p. s. i. Under such conditions, very little if any acetylene is formed, thereby eliminating the need for the auxiliary recovery system shown and subsequently described in the aforesaid flow diagram.

The reheat period may vary in duration depending upon the oxygen content of the gas in line 16 and the composition of the stream added through line 25. Ordinarily, however, this step requires only from about 1 to about 3 minutes. During this step the valve in line 14 is closed, valved line 28 opened, and the products thus formed are taken off thereby and treated as hereinafter described.

In the production step for reactor 20 the conditions are essentially identical with those described in connection with the operation of the first reactor. Hydrocarbon feed in line 12 is introduced into the second reactor 20 where it contacts hot refractory material 8 at a temperature of about 2500° F. The resulting products of combustion are quenched in the lower half of reactor 20 as previously described and withdrawn therefrom through line 18. In the reverse blow step for this reactor, valved lines 12, 16, 18, 28 and 29 are closed and air is added through lines 22 and 32. By this step, carbon deposited during the production cycle is removed from the refractory and the resulting hot gaseous products of combustion are led from the reactor through line 34 and discharged to the atmosphere. As in the operation of reactor 6, the reheat or regeneration cycle for reactor 20 is effected by first closing valved lines 12, 18, 25 and 34 and thereafter adding residue gas from lines 24 and 36. This residue gas is next mixed with sufficient air or oxygen added via lines 22 and/or 26 and 32 to effect a partial combustion of the hydrocarbons present therein. In this operation, the refractory in the lower portion of reactor 20 is cooled substantially while the upper portion thereof, where the combustion occurs, is heated to a temperature of about 2500° F. to condition said reactor for the following production cycle. The resulting hot products of partial combustion are withdrawn from the reactor through lines 35 and 29 where they, as well as partial combustion products from a similar cycle in reactor 6, are sent to cooler 38. In this cooling or quenching step, the hot product gas is reduced in temperature to about 300–350° F. The resulting cooled gas is then passed through line 40 to tar trap 42, where heavy components in the stream, if present, may be removed through line 44. In this connection, it is to be pointed out that the necessity of equipment for tar removal may be avoided if the reheat cycle is operated at pressures of from about 200 to about 400 p. s. i. Effluent gas from tar trap 42 is then conducted through line 46 to water quenching tower 48 where it contacts a spray or shower of water introduced through line 50 and discharged from said tower through line 52. Gas from quenching tower 48 is taken off through line 54 at a temperature of about 100° to about 150° F., for example 115° F., and introduced into a conventional absorber-stripper system employing an adsorbent of the mineral seal-oil type. Gas from line 54 is introduced into absorber 56 and passed countercurrently through a downwardly flowing column of absorbent which extracts or absorbs all components of the gas heavier than propane which are formed in the reactors during the regeneration cycle. Rich absorbent is then removed through line 58 and introduced into the stripper 60 wherein the absorber oil is separated from absorbed components. Lean oil is next taken from stripper 60 through line 62 and returned to absorber 56 for further use. Make-up absorbent may be added through line 64 as needed. Constituents taken up by the absorbent in absorber 56 are removed as a separate stream through line 66 from stripper 60 and consist chiefly of aromatic hydrocarbons. Separation of these materials into the pure components may be effected in accordance with well-known methods outside the scope of my invention.

Gas from absorber 56 consisting chiefly of acetylene, carbon monoxide, hydrogen and nitrogen is taken off through line 68 and sent to absorber 70 where it is countercurrently contacted with a descending stream of a selective solvent for acetylene such as, for example acetone, introduced at the top of the tower through line 71. Absorber 70 is operated at about 250 p. s. i. and at a temperature of about 100° F. Under these conditions, a stream of absorbent rich in acetylene is taken from the absorber through line 72 and treated as hereinafter described. The off gas from absorber 70 is taken through line 74 and consists chiefly of hydrogen and carbon monoxide. Nitrogen is also present in substantial quantities if air has been used in the regeneration step. In case the gas in line 74 is to be used for ammonia synthesis, said gas may be injected through line 76 into water-gas shift reactor 78, operated at a temperature of 700–900° F. and at a pressure of about 200–400 p. s. i. g. The catalyst employed for this purpose may be selected from any of a number of materials such as, for example, catalysts comprising a mixture of iron and chromium oxides. Within reactor 78, the reaction of steam and carbon monoxide occurs to form hydrogen and carbon dioxide. In order that conditions are provided which are suitable for the formation of hydrogen and carbon dioxide, steam is injected into the system through line 75. Product gas of increased hydrogen content is then withdrawn through line 80, and further purified in a known manner to remove residual water vapor, carbon dioxide and carbon monoxide, after which it is ready for use in ammonia synthesis by adjustment of nitrogen content. The latter may be accomplished by addition of nitrogen produced in conjunction with the manufacture of oxygen employed in the reheat cycle. If the gas in line 74 is desired for syntheses other than ammonia manufacture, it may be withdrawn through line 82 and purified in accordance with well-established gas purification techniques. However, in such case, the nitrogen content of the gas in line 74 should be low. As previously indicated, if gas of this character is required, substantially pure oxygen should be used in the previously-mentioned regeneration step in place of air.

The product gas in lines 10 and 18 which flows into line 84 has the following approximate composition when a gas consisting essentially of methane is used as the hydrocarbon source of the feed to the process:

Table I

| Component | Feed (Mols) | Products (Mols per 100 Mols Feed) |
|---|---|---|
| $H_2$ | | 106.0 |
| CO | | 6.0 |
| $CO_2$ | 4.3 | 2.6 |
| $CH_4$ | 84.3 | 39.0 |
| $C_2H_2$ | | 16.1 |
| $C_2H_4$ | | 1.6 |
| $C_2H_6$ | 6.8 | 0.3 |
| $C_3H_4$ | | 0.9 |
| $C_3$+Hydrocarbons | 4.6 | 0.7 |
| Total | 100.0 | 173.2 |

The temperature of this product gas is reduced by introduction thereof into cooler 86 after which it is taken through line 88 to tar trap 90 where high-boiling components, if present, are removed via line 92. Effluent gas from trap 90 is taken off through line 94 and further treated in quenching tower 96 into which water is introduced into line 98 in the form of a spray and discharged therefrom through line 100. The gas taken overhead through line 102 is now at a temperature of about 115° F. and contains substantial quantities of acetylene. This stream is introduced into absorber 104 where it is countercurrently contacted with a descending column of mineral seal oil which serves to remove substantially all components boiling higher than propane. Rich absorber oil is removed through line 106 and sent to stripper 60 via line 58 where extracted aromatics are separated therefrom overhead through line 66. Lean absorber oil is withdrawn from the bottom of stripper 60 through line 62 and the stream split allowing a portion thereof to flow through line 108 by which said oil is returned to the top of absorber 104 for further use. Effluent gas from absorber 104 containing acetylene, light saturated and unsaturated hydrocarbons, and hydrogen is taken overhead via line 110 and sent to absorber 112 where acetylene is selectively absorbed by a descending column of acetone introduced at the top of the tower through line 114. Acetone rich in acetylene is taken from the bottom of absorber 112, operated under conditions essentially equivalent to those used in absorber 70, through line 116, combined with the acetylene-rich acetone solution in line 72 from absorber 70 and thereafter sent to stripper 118 where a purified stream of acetylene is taken off overhead through line 120 at a temperature of from about 80–100° F. A lean acetone stream is withdrawn from the bottom of stripper 118 through line 114 and a portion thereof returned via line 71 for the operation of absorber 70. Make-up acetone may be added to the system as required through line 122. Overhead gases rich in hydrogen and light hydrocarbons is taken from absorber 112 through line 24 for use as fuel in the regeneration of reactors 6 and 20, preparatory to effecting alternate production cycles in these reactors.

In order to demonstrate further the superiority of the process of my invention over the partial oxidation process now available for the manufacture of acetylene, the following information is submitted:

Table II

| Run No. | Feed | Percent Carbon Converted to $C_2H_2$ | Coke Separately Burned | Volumes $H_2$+CO per Volume $O_2$ | Percent $O_2$ $O_2$-$N_2$ Mixture to Make $NH_3$ Synthesis Gas |
|---|---|---|---|---|---|
| 1 | $CH_4$ | 31.7 | No | 5.37 | 35.9 |
| 2 | $CH_4$ | 31.7 | Yes | 5.92 | 33.8 |
| 3 | $CH_4$ | 50.0 | No | 4.43 | 40.4 |
| 4 | $C_2H_6$ | 56.6 | Yes | 3.45 | 44.6 |
| 5 | $CH_4$ | 31.7 | | 2.00 | 60.0 |

In the above table, the first four runs are carried out in accordance with the teachings of my invention while run number 5 employs conditions of the type utilized in conventional partial oxidation methods for the production of acetylene. In runs 1 and 3, the reverse air blow procedure, as taught herein, to remove coke from the furnace refractory is not employed but is used in runs 2 and 4. The principal outstanding differences in the process of the present invention and the partial oxidation methods of the prior art are apparent from an inspection of columns 5 and 6 in the above table. Thus, in column 5, it is shown that only two mols of $H_2$+CO are recovered per mol of oxygen used in run 5, and that 60 percent oxygen is required in the gaseous reaction mixture in order to produce product gases from this step suitable for ammonia manufacture. Owing to the heat economies afforded by the process of my invention, it is possible to recover more than twice as much pure $H_2$+CO per unit of oxygen used than could be obtained by means of the aforesaid prior art partial oxidation method.

From the foregoing, it will be obvious that the process of my invention possesses numerous advantages over prior art procedures previously discussed herein. In particular, the following advantages are to be pointed out: (1) high thermal efficiency, (2) the formation of valuable by-product gases the composition of which can be readily controlled, and (3) the process may be effected without the use of pure oxygen, but, even if pure oxygen is considered necessary or desirable, a much smaller oxygen plant may be used than is required by prior art methods to produce a given quantity of acetylene and/or hydrogen plus carbon monoxide.

It will be understood that the above description, given in connection with the aforesaid flow diagram, is merely illustrative with respect to the feed, absorption agents, and conditions used in connection therewith. Other conditions for the operation of the process of my invention have been set forth in the present description while still other variations of said invention will be apparent to those skilled in the art. For example, while it is generally desirable to employ as fuel in the aforesaid regeneration step said stripped gaseous stream resulting from removal of acetylene in the product gases produced in the cracking step, it is also within the scope of my invention to employ for this purpose hydrocarbons from a separate source. For example, I may use for this purpose natural gas, substantially pure ethane, and the like. In instances where hydrocarbons from a source other than the process itself are used in the regenerating step, the quantity of oxygen required in the oxidizing gas should be based on the concentration or amount of hydrocarbon employed in said step. For example, in case natural gas or methane is used in the regeneration step in place of said stripped gaseous stream as fuel therein, the quantity of oxygen used should be from about 50 to about 65 volume percent, based on the amount of natural gas or methane employed in said step. If, on the other hand, ethane is used instead of methane or natural gas, the amount of oxygen employed should be in the range of from about 100 to about 130 percent of the ethane so used.

I claim:

1. In a process for the manufacture of acetylene from hydrocarbons whereby the latter are subjected to a cracking step at elevated temperature in a cracking zone, removing product gases from said zone and recovering acetylene from said gases to yield a residual hydrocarbon gas fraction suitable for use as fuel in the regeneration of said zone by combustion of said fraction with an oxygen-bearing gas, the improvement which comprises effecting regeneration of said zone by subjecting a hydrocarbon to partial oxidation in said zone with a quantity of an oxygen-bearing gas containing free oxygen in an amount corresponding to from about 35 to about 80 volume percent based on the quantity of hydrocarbon subjected to said cracking step, said oxygen-bearing gas having been preheated by passing it in contact with the hot surface of said cracking zone subsequent to said cracking step but prior to effecting partial oxidation of said hydrocarbon therewith, and recovering gaseous products of combustion containing hydrogen and carbon monoxide.

2. The process of claim 1 in which the hydrocarbon source of acetylene is natural gas and the quantity of oxygen-bearing gas employed for the regeneration step contains free oxygen in an amount corresponding to from about 35 to about 45 volume percent based on the quantity of hydrocarbon subjected to said cracking step.

3. The process of claim 1 in which the hydrocarbon source of acetylene is ethane and the quantity of oxygen-bearing gas employed for the regeneration step contains free oxygen in an amount corresponding to from about 70 to about 80 volume percent based on the quantity of hydrocarbon subjected to said cracking step.

4. In a process for the manufacture of acetylene from hydrocarbons whereby the latter are subjected to a cracking step at elevated temperature in a cracking zone, removing product gases from said zone and recovering acetylene from said gases, and regenerating said combustion zone, the improvement which comprises effecting a regeneration of said zone by subjecting a gaseous light saturated hydrocarbon to partial oxidation in said zone with a quantity of an oxygen-bearing gas containing free oxygen in an amount corresponding to from about 50 to about 130 volume percent based on the quantity of hydrocarbon subjected to said partial oxidation, said oxygen-bearing gas having been preheated by passing it in contact with the hot surface of said cracking zone subsequent to said cracking step but prior to effecting partial oxidation of said gaseous light hydrocarbon therewith, and recovering gaseous products of combustion containing hydrogen and carbon monoxide.

5. The process of claim 4 in which said gaseous light hydrocarbon is natural gas and the quantity of oxygen-bearing gas employed for the regeneration step contains free oxygen in an amount corresponding to from about 50 to about 65 volume percent based on the quantity of hydrocarbon subjected to said cracking step.

6. The process of claim 4 in which said gaseous light hydrocarbon is ethane and the quantity of oxygen-bearing gas employed for the regeneration step contains free oxygen in an amount corresponding to from about 100 to about 130 volume percent based on the quantity of hydrocarbon subjected to said cracking step.

7. In a process for the manufacture of acetylene from a light hydrocarbon gas consisting essentially of methane whereby the latter is subjected to a cracking step at an elevated temperature in a cracking zone, removing product gases from said zone and recovering acetylene from said gases to yield a residual methane-containing gas fraction suitable for use as fuel in the regeneration of said zone by combustion of said fraction with an oxygen-bearing gas, the improvement which comprises effecting regeneration of said zone by subjecting said methane-containing gas fraction to partial oxidation in said zone with a quantity of an oxygen-nitrogen-bearing gas containing free oxygen in an amount corresponding to from about 35 to about 45 volume percent base on the quantity of hydrocarbon subjected to said cracking step, said oxygen-bearing gas having been preheated by passing it in contact with the hot surface of said cracking zone subsequent to said cracking step but prior to effecting partial oxidation of said methane-containing gas fraction therewith, and recovering gaseous products of partial combustion containing hydrogen, carbon monoxide and nitrogen.

8. In a process for the manufacture of acetylene from a light hydrocarbon gas consisting essentially of methane whereby the latter is subjected to a cracking step at an elevated temperature in a cracking zone, removing product gases from said zone and recovering acetylene from said gases to yield a residual methane-containing gas fraction suitable for use as fuel in the regeneration of said zone by combustion of said fraction with an oxygen-bearing gas, the improvement which comprises effecting regeneration of said zone by subjecting said methane-containing gas fraction to partial oxidation in said zone with a quantity of an oxygen-nitrogen-bearing gas containing free oxygen in an amount corresponding to from about 35 to about 45 volume percent based on the quantity of hydrocarbon subjected to said cracking step, said oxygen-bearing gas having been preheated by passing it in contact with the hot surface of said zone subsequent to said cracking step but prior to effecting partial oxidation of said methane-containing gas fraction therewith, recovering gaseous products of partial combustion containing hydrogen, carbon monoxide and nitrogen, removing carbon monoxide from said recovered gaseous products, and adjusting the hydrogen to nitrogen ratio to a value suitable for use in ammonia synthesis.

9. In a process for the manufacture of acetylene from a light hydrocarbon gas consisting essentially of methane, whereby the latter is subjected to a cracking step at an elevated temperature in a cracking zone having a heat accumulating refractory surface, removing product gas from said zone and recovering acetylene from said gases to yield a residual methane-containing gas fraction suitable for use as fuel in the regeneration of said zone by combustion of said fraction with an oxygen-bearing gas, the improvement which comprises effecting regeneration of said zone by subjecting said methane-containing gas fraction to partial oxidation in said zone with a quantity of an oxygen-bearing gas containing free oxygen in an amount corresponding to from about 35 to about 45 volume percent based on the quantity of said light hydrocarbon gas subjected to said cracking step whereby heat from said partial oxidation is transferred to said refractory surface in an amount sufficient to bring the temperature of said surface up to the desired cracking temperature, said oxygen-bearing gas having been preheated by passing it in contact with the hot surface of said zone subsequent to said cracking step but prior to effecting partial oxidation of said methane-containing gas fraction therewith, and recovering gaseous products of partial combustion.

10. In a process for the manufacture of acetylene from a light hydrocarbon selected from the group consisting of methane, ethane and a mixture thereof whereby said light hydrocarbon is subjected to a cracking step at elevated temperature in a cracking zone and wherein free carbon is deposited therein, removing product gases from said zone and recovering acetylene from said gases to yield a residual light hydrocarbon-containing gas fraction suitable for use as a fuel in the regeneration of said zone by combustion of said fraction with an oxygen-bearing gas, the improvement which comprises effecting regeneration of said zone by first injecting air into said zone from the exit side thereof, whereby said carbon is converted to a hot gaseous mixture consisting essentially of carbon oxides, withdrawing said hot gaseous mixture from the inlet side of said zone, thereafter effecting further regeneration of said zone by subjecting said residual gas fraction to partial oxidation in said zone with a quantity of an oxygen-bearing gas containing free oxygen in an amount corresponding to from about 35 to about 80 volume percent based on the quantity and the composition of said light hydrocarbon subjected to said cracking step, said oxygen-bearing gas having been preheated by passing it in contact with the hot surface of said zone subsequent to said cracking step but prior to effecting partial oxidation of said residual gas fraction therewith, and recovering gaseous products of combustion containing hydrogen and carbon monoxide.

11. In a process for the manufacture of acetylene from hydrocarbons whereby the latter are subjected to a cracking step at elevated temperature in a cracking zone, removing product gases from said zone and recovering acetylene from said gases to yield a residual hydrocarbon gas fraction suitable for use as fuel in the regeneration of said zone by combustion of said fraction with an oxygen-bearing gas, the improvement which comprises effecting regeneration of said zone by subjecting said residual hydrocarbon gas fraction to partial oxidation in said zone with a quantity of an oxygen-bearing gas containing free oxygen in an amount corresponding to from about 35 to about 80 volume percent based on the quantity of hydrocarbon subjected to said cracking step, said oxygen-bearing gas having been preheated by passing it in contact with the hot surface of said zone subsequent to said cracking step but prior to effecting partial oxidation of said residual hydrocarbon gas fraction therewith, and recovering gaseous products of combustion containing hydrogen and carbon monoxide.

References Cited in the file of this patent

UNITED STATES PATENTS

| | | |
|---|---|---|
| 1,965,770 | Burgin | July 10, 1934 |
| 2,377,847 | Allen et al. | June 12, 1945 |
| 2,475,093 | Hasche | July 5, 1949 |
| 2,498,444 | Orr | Feb. 21, 1950 |
| 2,678,339 | Harris | May 11, 1954 |
| 2,679,540 | Berg | May 25, 1954 |
| 2,706,210 | Harris | Apr. 12, 1955 |

FOREIGN PATENTS

| | | |
|---|---|---|
| 583,851 | Germany | Sept. 13, 1933 |